(12) United States Patent
Sasai

(10) Patent No.: US 6,701,024 B1
(45) Date of Patent: Mar. 2, 2004

(54) IMAGE PROCESSING APPARATUS

(75) Inventor: Toshihiro Sasai, Kyoto (JP)

(73) Assignee: NuCore Technology Inc., Santa Clara, CA (US)

( * ) Notice: Subject to any disclaimer, the term of this patent is extended or adjusted under 35 U.S.C. 154(b) by 601 days.

(21) Appl. No.: 09/630,285

(22) Filed: Aug. 1, 2000

(30) Foreign Application Priority Data

Aug. 5, 1999 (JP) .............................................. 11-222524

(51) Int. Cl.[7] .................................................. G06K 9/40
(52) U.S. Cl. ...................................... 382/260; 382/274
(58) Field of Search .......................... 382/205, 260–266, 382/308, 199, 251, 274; 358/532

(56) References Cited

U.S. PATENT DOCUMENTS

| 5,038,387 | A | * | 8/1991 | Sakamoto ................... 382/266 |
| 5,051,902 | A | * | 9/1991 | Hishinuma .................. 382/263 |
| 5,345,517 | A | * | 9/1994 | Katayama et al. .......... 382/299 |
| 5,485,534 | A | * | 1/1996 | Takemoto et al. .......... 382/263 |
| 5,614,947 | A | | 3/1997 | Tanizoe et al. |
| 5,684,600 | A | | 11/1997 | Miyazaki et al. ............ 382/266 |
| 5,854,859 | A | | 12/1998 | Sobol ......................... 382/261 |
| 5,959,693 | A | | 9/1999 | Wu et al. |

FOREIGN PATENT DOCUMENTS

| EP | 0 454 234 A2 | 10/1991 |
| EP | 0 496 573 A1 | 7/1992 |
| EP | 0 796 101 A1 | 7/1997 |
| EP | 0 851 665 A2 | 7/1998 |
| EP | 1 079 604 A2 | 2/2001 |

OTHER PUBLICATIONS

Oh et al., "Cascade/Parallel Form FIR Filters With Powers–of–Two Coefficients," Circuits and Sysems, 1994, ISCAS '94., 1994. IEEE International Symposium on London, UK May 30–Jun. 2, 1994, New York, NY, USA IEEE, US, pp 545–548 XP010143079, ISBN: 0–7803–1915–X, p. 545, col. 1, Para. 1.

* cited by examiner

Primary Examiner—Amelia M. Au
Assistant Examiner—Colin LaRose
(74) Attorney, Agent, or Firm—Townsend and Townsend and Crew LLP; Kenneth R. Allen

(57) ABSTRACT

An image processing apparatus for calculating a new luminance value of a central pixel to adjust the spatial frequency characteristics of an input image includes a plurality of subfilters, totalizer, and adder. The subfilters are arranged in parallel with each other for a plurality of pixel groups each made up of one or more pixels in a submatrix. The subfilters multiply the sums of the luminance values of pixels included in corresponding pixel groups by predetermined coefficients corresponding to desired spatial frequency adjustment filter characteristics, and output the products for each submatrix made up of M×M (M is an odd number of 3 or more) pixels centered on pixels constituting an input image for a two-dimensional input image made up of many pixels that are arrayed in a matrix and represent luminance values at positions. The totalizer totals outputs from the subfilters, and outputs the sum as the adjustment amount of the spatial frequency characteristics. The adder adds the adjustment amount obtained by the totalizer to the original luminance value of the central pixel, and outputs the sum as a new luminance value of the central pixel for each matrix.

13 Claims, 10 Drawing Sheets $R_0 = 2^4 + 2^3$
$R_1 = 0$
$R_2 = -1$
$R_3 = 0$
FIG. 4A
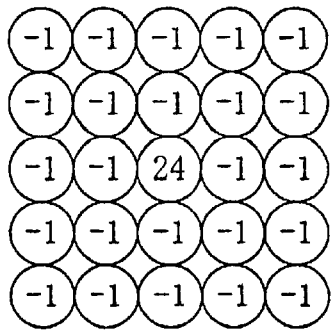
FIG. 4B
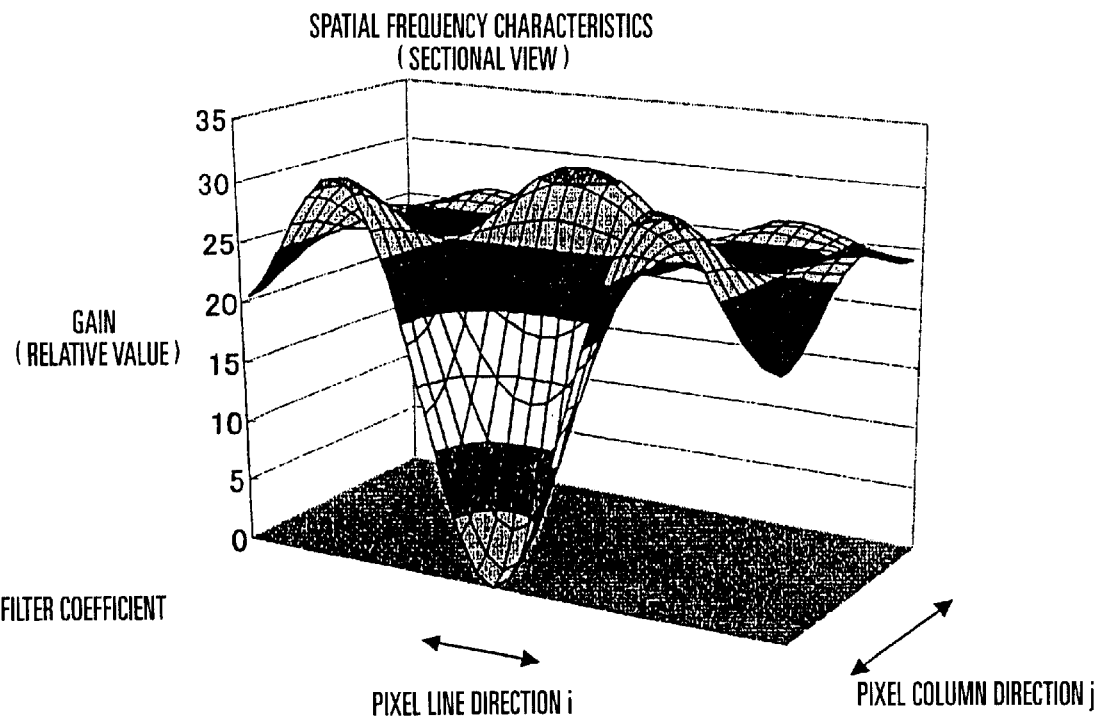
FIG. 4C

$R_0 = 2^6 + 2^5$
$R_1 = -1 \times (2^2 + 2^0)$
$R_2 = -1$
$R_3 = -1 \times 2^3$
FIG. 5A
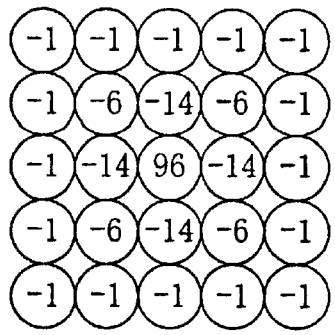
FIG. 5B
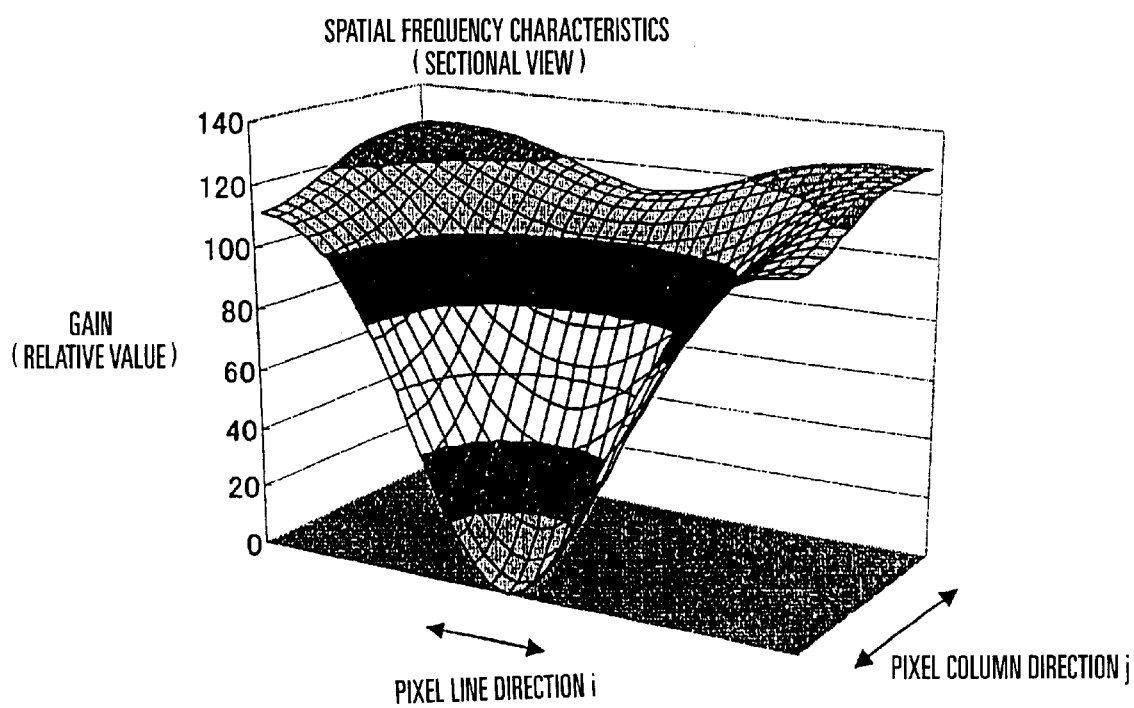
FIG. 5C

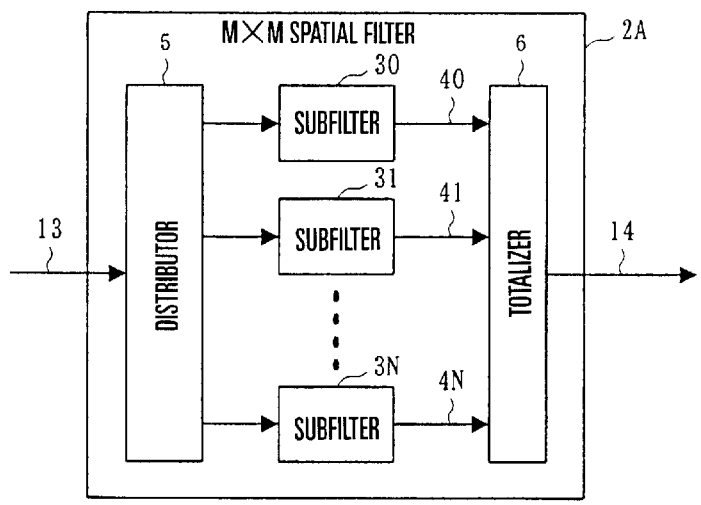
FIG. 6
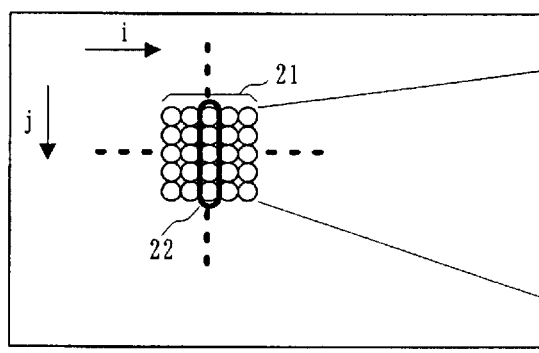
FIG.7A
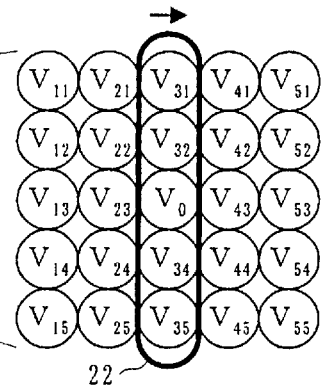
FIG.7B
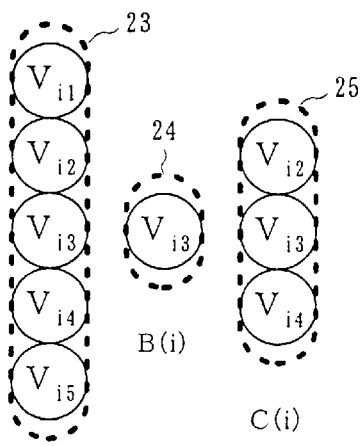
FIG.7C
$30S = B(3)$
$31S = C(2) + C(3) + C(4) - B(3)$
$32S = A(1) + A(2) + A(3) + A(4) + A(5) - B(3)$
$33S = B(2) + C(3) + B(4) - B(3)$
FIG.7D

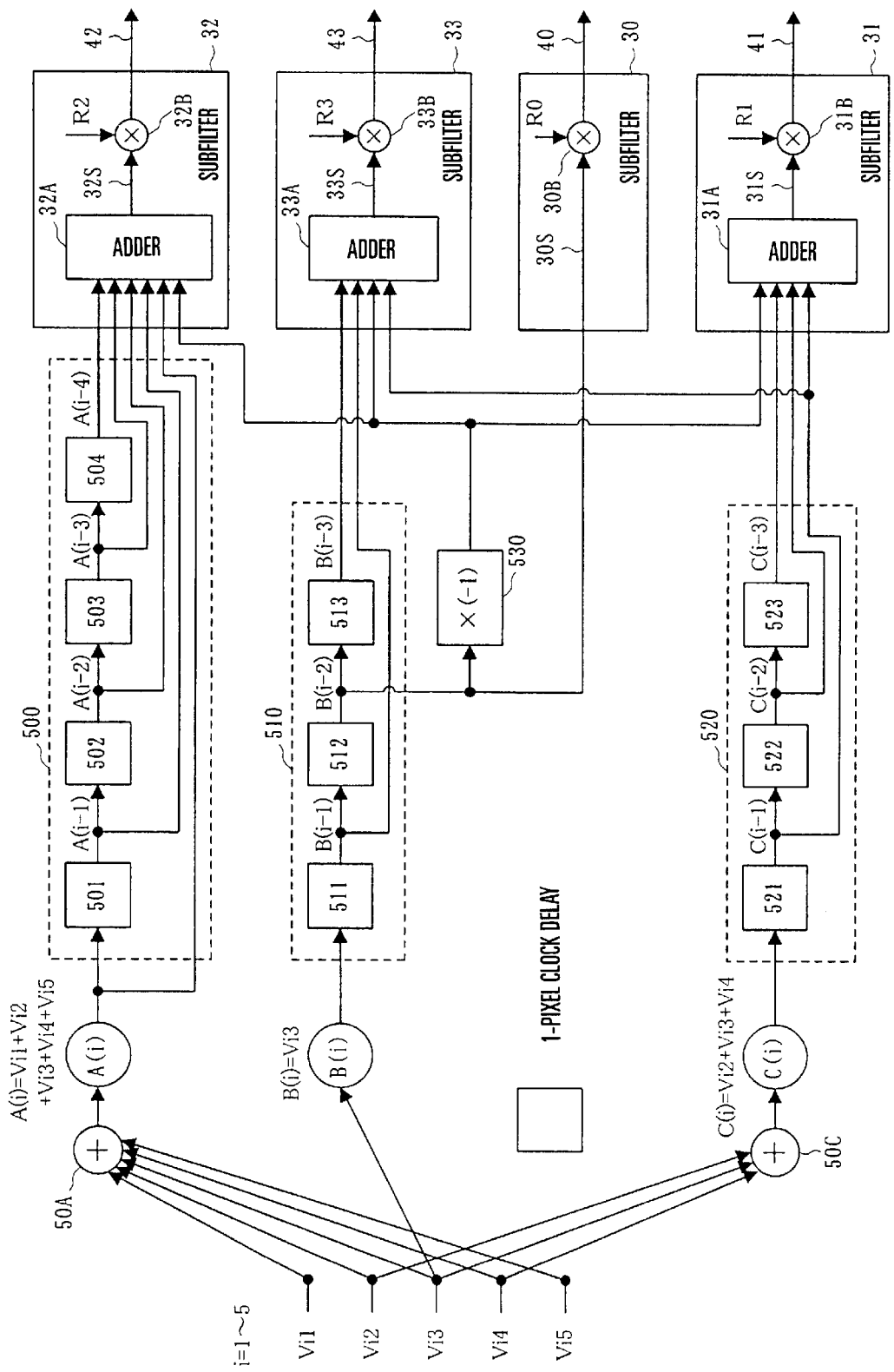

IMAGE PROCESSING APPARATUS

BACKGROUND OF THE INVENTION

The present invention relates to an image processing apparatus and, more particularly, to an image processing apparatus for adjusting the spatial frequency characteristics of a two-dimensional image sensed by an electronic camera.

An image sensing apparatus such as an electronic camera (digital still camera) for sensing an image using an image sensor such as a multi-color CCD adjusts the spatial frequency characteristics of an obtained two-dimensional image.

For example, in an image sensing apparatus using a single multi-color filtered CCD, an obtained image is made up of many pixels having luminance values of different color components such as R, G, and B.

Pixels of the same color component are arrayed in a checkered pattern, and the resolution is substantially low in comparison with the number of pixels.

A general electronic camera comprises an image processing apparatus to adjust the spatial frequency characteristics of an input image in order to perform edge enhancement of an input image or another image processing for compensating for low resolution.

As shown in FIG. 14, a conventional image processing apparatus 110 adjusts spatial frequency characteristics by software convolution calculation using a DSP (Digital Signal Processor) 120.

An image signal obtained by an image sensor (CCD) 10 is A/D-converted by a signal converter 11, and stored as an input image in a memory 12.

An input image 13 read out from the memory 12 is processed by the DSP 120 for each submatrix of M×M pixels (M is an odd number of 3 or more), and a new luminance value 130 of the central pixel is calculated to obtain an output image 19 whose spatial frequency characteristics are adjusted.

In general, spatial filtering processing for adjusting spatial frequency characteristics must execute, every M×M pixels, so-called product-sum calculation processing of multiplying the luminances of the pixels and predetermined coefficients corresponding to the pixels, and adding the products of all the pixels.

There are proposed a method of preparing a plurality of filter coefficients used to adjust spatial frequency characteristics, and adaptively selecting and using these filter coefficients based on the pixel pattern of a predetermined region (see, e.g., U.S. Pat. No. 5,684,600), and a method of expressing coefficients for a central pixel and its adjacent pixels as a function of a variable k, and selecting k based on the luminance value of the central pixel to adaptively switch the degree of adjustment of spatial frequency characteristics (see, e.g., U.S. Pat. No. 5,854,859).

Since the conventional image apparatus performs product-sum calculation by software, the degree of freedom in adjustment of spatial frequency characteristics is large. However, when the target is a large submatrix, or complicated processing such as adaptive setting of a high-frequency enhancement degree is to be performed, the calculation time increases in accordance with the processing amount and complexity. Moreover, different processes must be done in accordance with predetermined conditions, so the image processing apparatus cannot cope with high-speed, real-time processing.

If spatial frequency characteristics are adjusted by hardware, the image processing apparatus can cope with real-time processing. However, the submatrix is downsized to minimize increases in circuit scale, processing time, and power consumption. This limits the degree of freedom in adjustment of spatial frequency characteristics.

Recently, high-resolution image sensing elements having more than two million pixels are becoming popular. The image processing apparatus has a low-resolution mode using pixels smaller in number than the pixels of the image sensing element in order to increase the number of recordable images. For this reason, the image processing apparatus must process images having a plurality of resolutions. The apparatus must adjust not only the characteristics of an optical system but also spatial frequency characteristics more flexibly.

SUMMARY OF THE INVENTION

The present invention has been made to overcome the conventional drawbacks, and has as its object to provide an image processing apparatus capable of adjusting spatial frequency characteristics at high speed without performing complicated calculation processing.

To achieve the above object, according to the present invention, there is provided an image processing apparatus for calculating a new luminance value of a central pixel to adjust spatial frequency characteristics of an input image, comprising a plurality of subfilters which are arranged in parallel with each other for a plurality of pixel groups each made up of at least one pixel in a submatrix, multiply sums of luminance values of pixels included in corresponding pixel groups by predetermined coefficients corresponding to desired spatial frequency adjustment filter characteristics, and output products for each submatrix made up of M×M (M is an odd number of not less than 3) pixels centered on pixels constituting an input image for a two-dimensional input image made up of many pixels that are arrayed in a matrix and represent luminance values at positions, totalization means for totaling outputs from the subfilters and outputting a sum as an adjustment amount of the spatial frequency characteristics, and addition means for adding the adjustment amount obtained by the totalization means to an original luminance value of the central pixel and outputting a sum as a new luminance value of the central pixel for each matrix.

BRIEF DESCRIPTION OF THE DRAWINGS

FIGS. 4A to 4C are explanatory views showing an example of spatial frequency characteristics;

FIGS. 5A to 5C are explanatory views showing another example of spatial frequency characteristics;

FIG. 6 is a block diagram showing an arrangement of a spatial filter according to the second embodiment;

FIGS. 7A to 7D are explanatory views showing the operation of a distributor;

FIG. 8 is a block diagram showing an arrangement of the distributor;

DESCRIPTION OF THE PREFERRED EMBODIMENTS

The present invention will be described with reference to the accompanying drawings.

Figure 1:
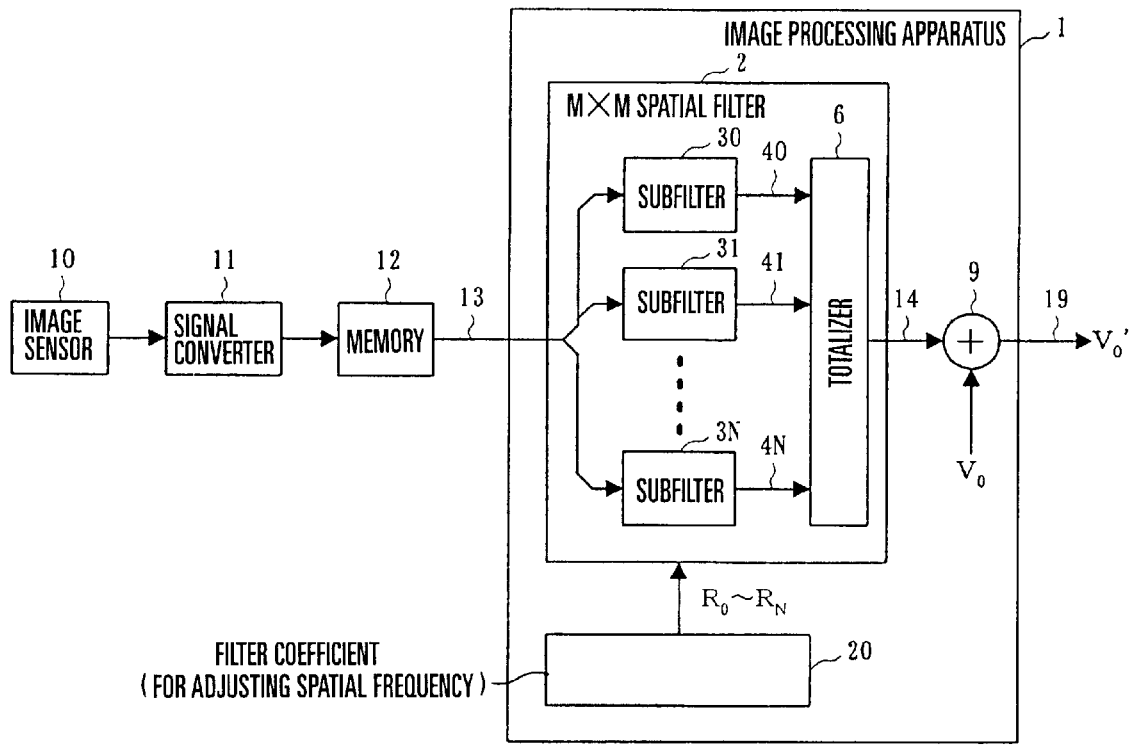
FIG. 1 is a block diagram showing an image processing apparatus according to the first embodiment of the present invention.

FIG. 1 shows an image processing apparatus according to the first embodiment of the present invention.

In FIG. 1, reference numeral 10 denotes an image sensor comprised of an image sensing element such as a CCD; 11, a signal converter for A/D-converting an image signal obtained by the image sensor 10 and storing the converted signal in a memory 12; and 1, an image processing apparatus for sequentially reading out an input image 13 from the memory 12 and outputting an output image 19 whose spatial frequency characteristics are adjusted based on a predetermined filter coefficient 20.

The input image 13 may undergo image processing such as color conversion or gamma conversion when or after being stored in the memory 12.

The image processing apparatus 1 comprises a spatial filter 2 for calculating the adjustment amount of spatial frequency characteristics at the central pixel of a submatrix using the filter coefficient 20 for each submatrix made up of M×M pixels (M is an odd number of 3 or more) in the input image 13, and outputting the adjustment amount as a filter output 14, and an adder 9 for adding the filter output 14 from the spatial filter 2 to an original luminance value $V_0$ of the central pixel of the submatrix from which the filter output 14 is obtained, calculating a new luminance value of the central pixel, and outputting the new luminance value as the output image 19.

The spatial filter 2 comprises a plurality of subfilters 30 to 3N for multiplying, for a plurality of pixel groups each made up of one or more pixels in a submatrix made up of M×M pixels in the input image 13, the sums of the luminance values of pixels included in corresponding pixel groups by predetermined coefficients $R_0$ to $R_N$ corresponding to desired spatial frequency adjustment filter characteristics, and outputting the products, and a totalizer 6 for totaling outputs 40 to 4N from these subfilters and outputting the sum as the filter output 14.

Figure 2:
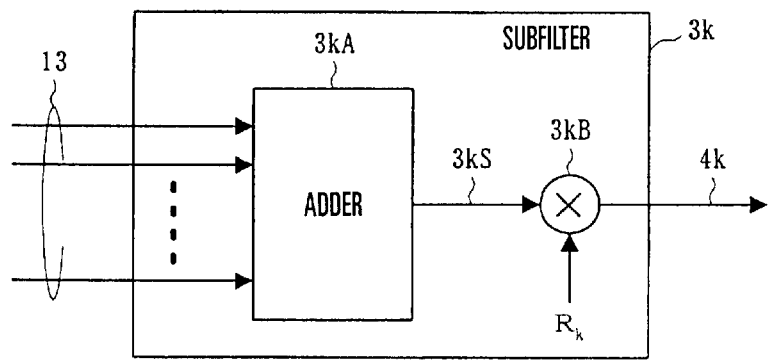
FIG. 2 is a block diagram showing an arrangement of each subfilter.

FIG. 2 shows an arrangement of each subfilter.

Each subfilter 3k (k is an integer of 0 to N) includes an adder 3kA for adding the luminance values of one or more pixels included in a pixel group corresponding to the subfilter 3k, and a multiplier 3kB for multiplying an output 3kS from the adder 3kA by a coefficient $R_k$ corresponding to the subfilter 3k, and outputting the product as an output 4k.

When the number of pixels constituting a pixel group is one, the adder 3kA may be omitted.

The operation according to the first embodiment of the present invention will be described with reference to FIGS. 3A and 3B.

Figure 3A:
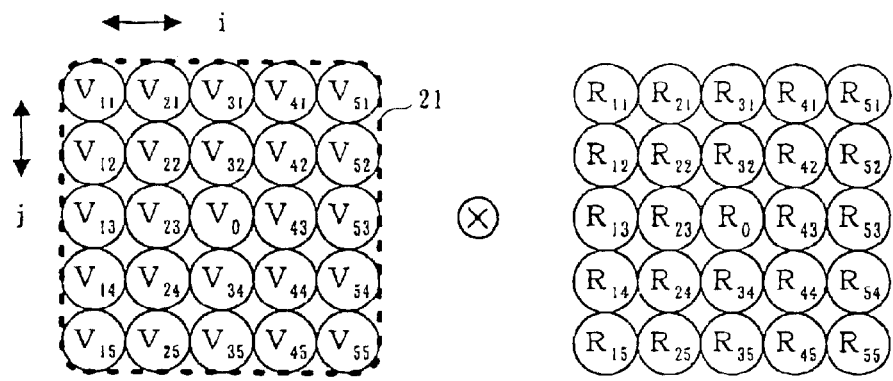
FIGS. 3A and 3B are explanatory views showing the operation according to the first embodiment.
Figure 3B:
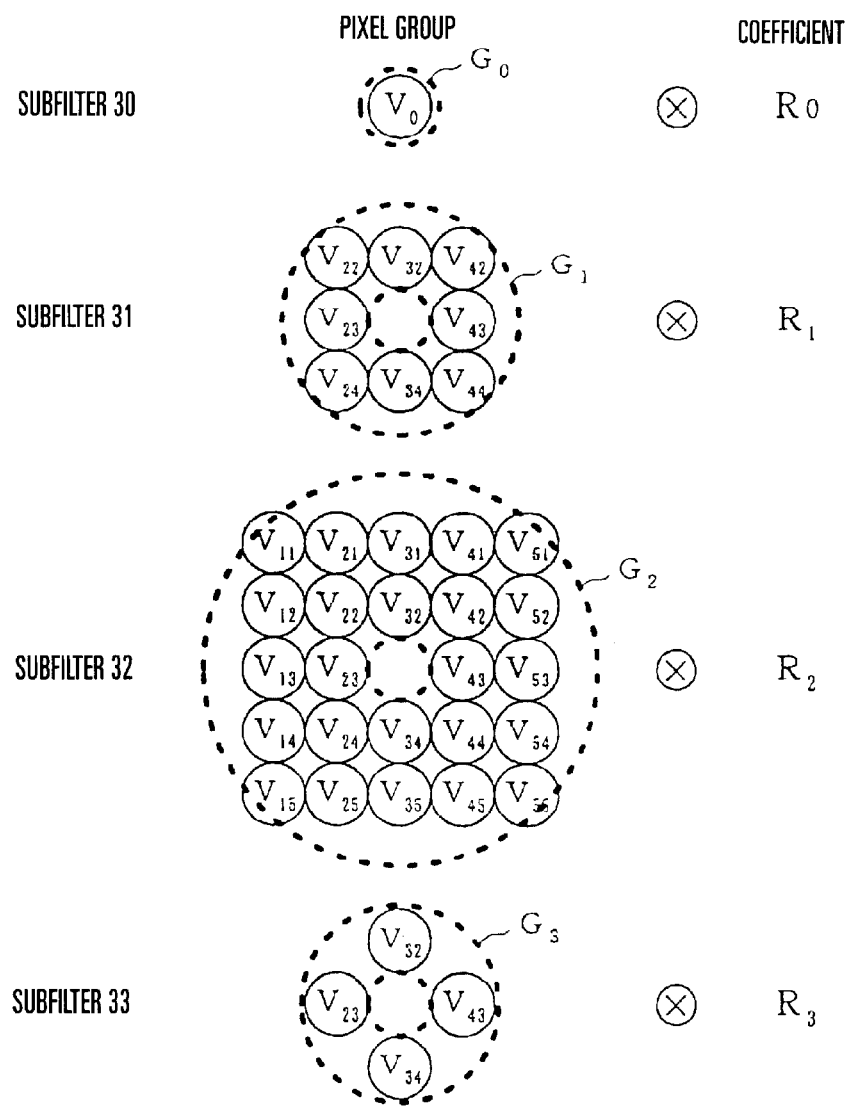

FIGS. 3A and 3B show the operation according to the first embodiment. FIG. 3A shows the arrangements of the submatrix and filter coefficient, and FIG. 3B show processing by the subfilter.

A case wherein spatial frequency characteristics are adjusted using a submatrix for M=5 will be explained.

As shown in FIG. 3A, for M=5, a submatrix 21 is made up of 5×5 pixels $V_{11}$ to $V_{55}$ aligned in a pixel line direction i and pixel column direction j in units of 5.

To adjust spatial frequency characteristics in this submatrix 21, the luminance value of the pixel $V_{33}$, i.e., central pixel $V_0$ positioned at the center of the submatrix 21 is compensated using the sum of the products of the pixel values of the pixels $V_{11}$ to $V_{55}$ in the submatrix 21 and corresponding filter coefficients $R_{11}$ to $R_{55}$.

As shown in FIG. 3B, of pixels constituting the submatrix 21, a central pixel group $G_0$ formed from the central pixel $V_0$, and peripheral pixel groups $G_1$ to $G_3$ each formed from four or more peripheral pixels (pixels other than the central pixel) positioned point-symmetrically about the central pixel $V_0$ are set for the submatrix 21 in advance.

Particularly, pixels constituting the peripheral pixel groups $G_1$ to $G_3$ fall within the range of m×m pixels (m is 3 to M) from the central pixel $V_0$. Peripheral pixels positioned within a concentric band having an arbitrary radius from the central pixel $V_0$ belong to the same peripheral pixel group.

By setting individual coefficients for the peripheral pixel groups $G_1$ to $G_3$, the contribution degree of each peripheral pixel to the central pixel $V_0$ can be selected based on a rough distance from the central pixel $V_0$ in adjusting spatial frequency characteristics. A desired spatial frequency characteristic can be easily set as a specific coefficient without performing complicated calculation.

FIGS. 4A to 4C show an example of spatial frequency characteristics.

As coefficients for the pixel groups in FIG. 3B, $R_0=2^4+2^3=24$, $R_1=0$, $R_2=-1$, and $R_3=0$ shown in FIG. 4A are used. Coefficients corresponding to pixels are shown in FIG. 4B.

As shown in FIG. 4C, the contribution degree is uniformly set for peripheral pixels in a wide range, and relatively gradual spatial frequency characteristics which exhibit the highest gain in the middle- and high-frequency ranges are attained.

FIGS. 5A to 5C show another example of spatial frequency characteristics.

As coefficients for the pixel groups in FIG. 3B, $R_0=2^6+2^5=96$, $R_1=-1\times(2^2+2^0)=-5$, $R_2=-1$, and $R_3=2^3=8$ shown in FIG. 5A are used. Coefficients corresponding to pixels are shown in FIG. 5B.

As shown in FIG. 5C, a higher contribution degree is set for a pixel nearer the central pixel $V_0$, and relatively steep spatial frequency characteristics which exhibit a higher gain in the high-frequency range than in FIG. 4C are attained.

In this manner, the central pixel group $G_0$ and peripheral pixel groups $G_1$ to $G_3$ are assigned to the submatrix 21 extracted from the input image 13. The sums of the pixel values of pixels included in the respective pixel groups and the coefficients $R_0$ to $R_3$ corresponding to the pixel groups are multiplied by the subfilters 30 to 34 in parallel with each other.

The products obtained for the respective pixel groups are totaled by the totalizer 6 to attain a spatial frequency characteristic adjustment amount, i.e., filter output 14.

The adder 9 adds the filter output 14 to the central pixel $V_0$ to obtain a new luminance value $V_0'$ of the central pixel whose spatial frequency characteristics are adjusted.

This processing is repetitively executed for each pixel of the input image 13. In other words, the submatrix 21 is sequentially scanned on the input image 13 to calculate the new luminance value $V_0'$ of the central pixel $V_0$. Accordingly, the output image 19 having desired spatial frequency characteristics can be obtained.

According to the present invention, a plurality of peripheral pixel groups $G_0$ to $G_3$ each made up of one or more pixels in a submatrix are set for the submatrix 21 in advance. Subfilters are arranged in correspondence with these pixel groups. The subfilters multiply in parallel with each other the sums of the luminance values of pixels included in corresponding pixel groups by predetermined coefficients corresponding to desired filter characteristics for adjusting spatial frequency characteristics. The products are totaled by the totalizer 6. The obtained filter output 14 is added by the adder 9 to the luminance value of the original central pixel $V_0$, thereby outputting the sum as the new luminance value $V_0'$.

Hence, relative simple calculation processing, such as calculation by the subfilters 30 to 34, totalization by the totalizer 6, and addition by the adder 9, can adjust spatial frequency characteristics with a large degree of freedom without performing complicated calculation processing.

Since each of the subfilters 30 to 34 executes addition and multiplication only once, spatial frequency characteristics can be adjusted by relatively simple calculation processing. At the same time, since calculation operations by the subfilters 30 to 34 are executed in parallel with each other, spatial frequency characteristics can be adjusted in real time at a higher speed than in the prior art in which product-sum calculation using a predetermined coefficient for each pixel is done by a DSP.

In FIGS. 4A to 4C and 5A to 5C, the coefficients $R_0$ to $R_3$ are set such that the sum of the coefficients $R_{11}$ to $R_{55}$ multiplied by respective pixels becomes 0. Alternatively, the coefficients $R_0$ to $R_3$ may be set such that the sum of the coefficients $R_{11}$ to $R_{55}$ multiplied by respective pixels becomes 1.

In this case, processing of adding the obtained spatial frequency characteristic adjustment amount to the luminance value of the original central pixel $V_0$ is done by the totalizer 6, and the adder 9 can be omitted.

The final filter gain changes depending on the setting of each coefficient. The filter output 14 obtained by the totalizer 6 may be compensated by dividing it by a proper value, e.g., $R_0$ or a power of 2 close to $R_0$.

Accordingly, a luminance value after spatial frequency characteristics are adjusted can be normalized to a certain degree by only bit shift calculation, so that changes in high-frequency enhancement degree caused by a combination of coefficients can be easily suppressed.

The filter output 14 may also be compensated and normalized by another method.

The second embodiment of the present invention will be described with reference to FIG. 6.

In the first embodiment, the subfilters 30 to 3N directly receive the pixel values of necessary pixels from the input image 13. In the second embodiment, as shown in FIG. 6, a distributor 5 is arranged on the input side of subfilters 30 to 3N. The distributor 5 receives and pre-processes an input image 13, and distributes it to the subfilters 30 to 3N.

The operation of the distributor 5 will be explained with reference to FIGS. 7A to 7D.

FIGS. 7A to 7D show the operation of the distributor. FIG. 7A shows the two-dimensional image of an input image, FIG. 7B shows a submatrix, FIG. 7C shows an example of a pixel region set in the submatrix, and FIG. 7D shows equations for the pixel groups of respective subfilters.

As shown in FIG. 7A, the distributor 5 sequentially receives, as a pixel block 22, pixel values constituting the input image 13 by several pixel lines (j direction), e.g., by M=5 pixel lines of a submatrix 21 in parallel with each other.

As shown in FIG. 7B, successively received pixel blocks 22 of M=5 pixel columns constitute the submatrix 21.

Then, the submatrix 21 shifts in units of pixels in the i direction on the two-dimensional image.

For each pixel block 22, as shown in FIG. 7C, the distributor 5 calculates the sums of the pixel values of pixels belonging to corresponding pixel regions for pixel regions A to C set in advance.

Of region values A(i) to C(i) of the M-pixel block, the distributor 5 holds and parallel-outputs predetermined region values, as needed.

The subfilters 30 to 3N selectively use the parallel-output region values, and calculate sums 30S to 33S of the pixel groups of a corresponding submatrix 21, as shown in FIG. 7D.

The pixel regions are set based on the arrangement of pixel groups used by the subsequent subfilters 30 to 33. FIG. 7C shows the pixel regions A to C when the present invention is applied to the pixel groups $G_1$ to $G_3$ in FIG. 3B described in the first embodiment.

A case wherein the pixel regions A to C are set will be exemplified.

FIG. 8 shows an arrangement of the distributor.

In FIG. 8, reference numerals 50A and 50C denote adders for calculating the region values A(i) and C(i) from the pixel values $V_{i1}$ to $V_{i5}$ of the pixel block 22.

Since the region value B(i) uses only $V_{i3}$, a corresponding adder is omitted.

Reference numerals 500, 510, and 520 denote shift registers made up of series-connected 1-pixel clock delays 501 to 504, 511 to 513, and 521 to 523, respectively. The shift registers 500, 510, and 520 are parallel-arranged for the corresponding region values A(i) to C(i).

Note that the "1-pixel clock delay" (to be referred to as a delay hereinafter) means a latch circuit for outputting an input pixel value with a delay in synchronism with a clock signal in the pixel line direction (i direction).

When five successive pixel blocks 22 are sequentially received by the distributor 5, outputs from the delays of the shift registers 500 to 520 are selectively distributed to adders 31A to 33A of subfilters 31 to 33.

An output from the delay 512 corresponding to the central pixel $V_0$ is converted into a negative number by an inverter 530, and distributed to the adders 31A to 33A of the subfilters 31 to 33.

Then, the adders 31A to 33A of the subfilters 31 to 33 calculate sums 31S to 33S of the pixel values of pixels included in corresponding pixel groups. Multipliers 31B to 33B multiply the sums 31S to 33S by corresponding coefficients $R_1$ to $R_3$, and output the products as subfilter outputs 41 to 43.

The subfilter 30 regards a distributed delay output as a sum 30S of the pixel group $G_0$, multiplies the sum 30S by a corresponding coefficient $R_0$ by a multiplier 30B, and outputs the product as a subfilter output 40.

As described above, the second embodiment adopts the distributor 5 to calculate, for pixel regions set in advance on the pixel block 22, the sums of the pixel values of pixels belonging to corresponding pixel regions as the region values A to C. The distributor 5 parallel-outputs these region values in synchronism with reception of the pixel block 22. The subfilters 30 to 33 selectively use the parallel-output region values to sequentially calculate and output the sums 30S to 33S of luminance values in the corresponding pixel groups $G_0$ to $G_3$.

The submatrix 21 shifts on the two-dimensional plan image of the input image 13 in synchronism with reception of the pixel block 22. At the same time, a new luminance value of the central pixel of the submatrix is obtained. As a result, pipeline processing synchronized with reception of the pixel block 22 can be realized.

Compared to processing of adjusting spatial frequency characteristics by numerical calculation using a DSP or the like, a higher-quality image can be output at a higher speed.

As coefficients used by the subfilters 30 to 3N, a power of 2 or the sum of powers of 2 may be selected. In this case, the multipliers 30B to 3NB used by respective subfilters can be formed by bit shift circuits, which greatly simplifies the circuit arrangement.

Coefficients used by the subfilters 30 to 3N may be variable.

Figure 9:
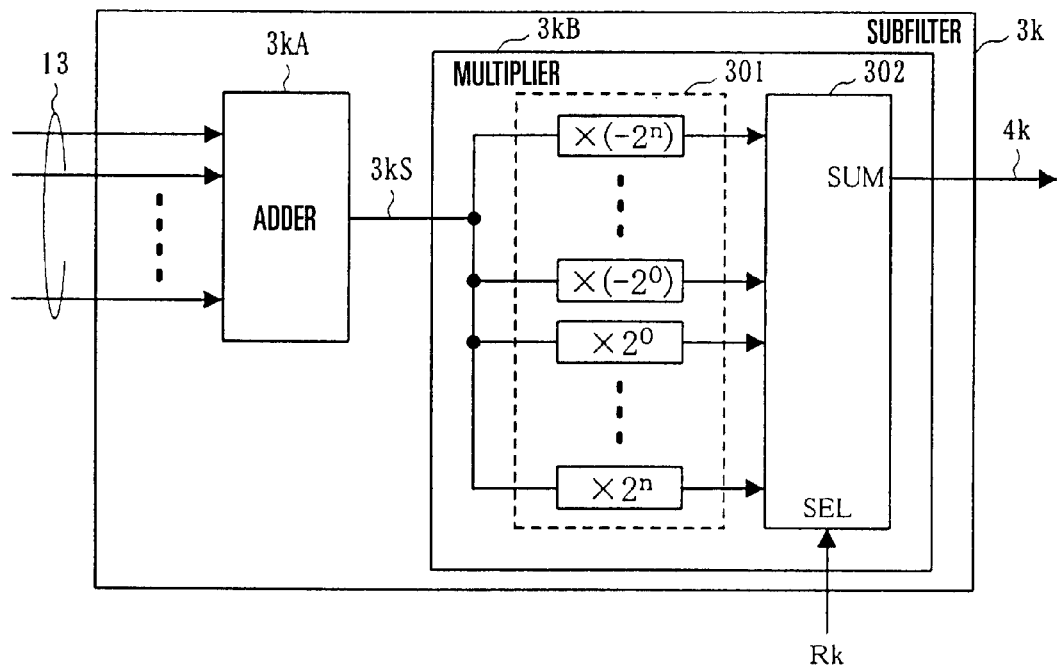
FIG. 9 is a block diagram showing another arrangement of the subfilter.

FIG. 9 shows another arrangement of the subfilter.

In FIG. 9, reference numeral 301 denotes a multiplication section made up of a plurality of multipliers for multiplying a sum 3kS by powers (positive or negative) of 2. These multipliers are parallel-connected.

Reference numeral 302 denotes an adder for selectively adding one or more outputs from the multipliers of the multiplication section 301 based on a coefficient $R_k$, or outputting 0.

Arbitrarily selecting and inputting the coefficient $R_k$ can attain arbitrary spatial frequency characteristics.

Since the multiplication section 301 is made up of a plurality of multipliers for multiplying a sum by powers of 2, the sum 3kS can be multiplied by an arbitrary coefficient $R_k$ by a simple circuit arrangement.

The third embodiment of the present invention will be described with reference to FIG. 10.

Figure 10:
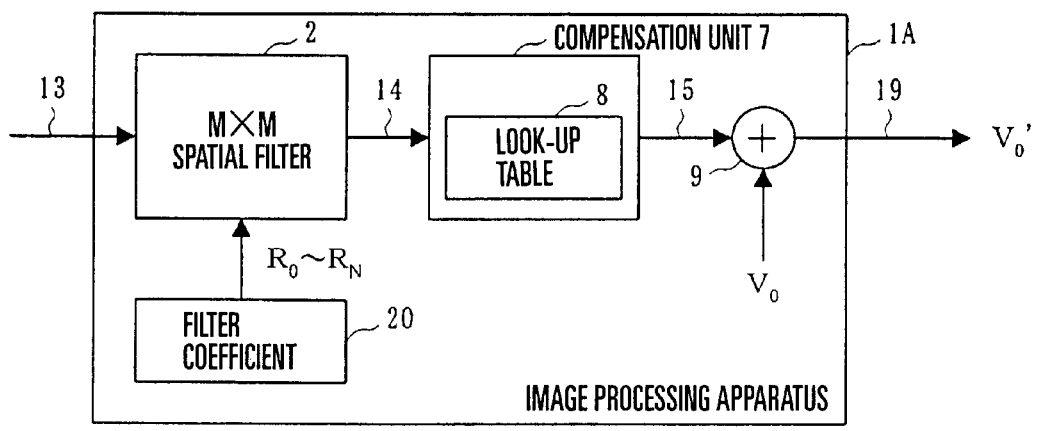
FIG. 10 is a block diagram showing an arrangement of an image processing apparatus according to the third embodiment.

FIG. 10 shows an arrangement of an image processing apparatus according to the third embodiment.

In the third embodiment, a compensation unit 7 having a look-up table 8 is arranged between an M×M spatial filter 2 and an adder 9 to further compensate for a spatial frequency characteristic adjustment amount, i.e., filter output 14 obtained by the M×M spatial filter 2.

In FIG. 10, the compensation unit 7 receives the filter output 14 (digital value) of the M×M spatial filter 2, refers to the look-up table 8 in which a predetermined input/output characteristic is set in advance, obtains an output value corresponding to the input, and outputs the output value as a compensated adjustment amount, i.e., output 15.

The adder 9 adds the output 15 from the compensation unit 7 to the luminance value of a central pixel $V_0$ of an original submatrix 21 from which the output 15 is obtained, and outputs the sum as a new luminance value $V_0'$.

The amount, i.e., adjustment amount added to the central pixel $V_0$ can be changed in accordance with the output 14 of the M×M spatial filter 2, i.e., the magnitude (power) of a spatial frequency component.

Figure 11A:
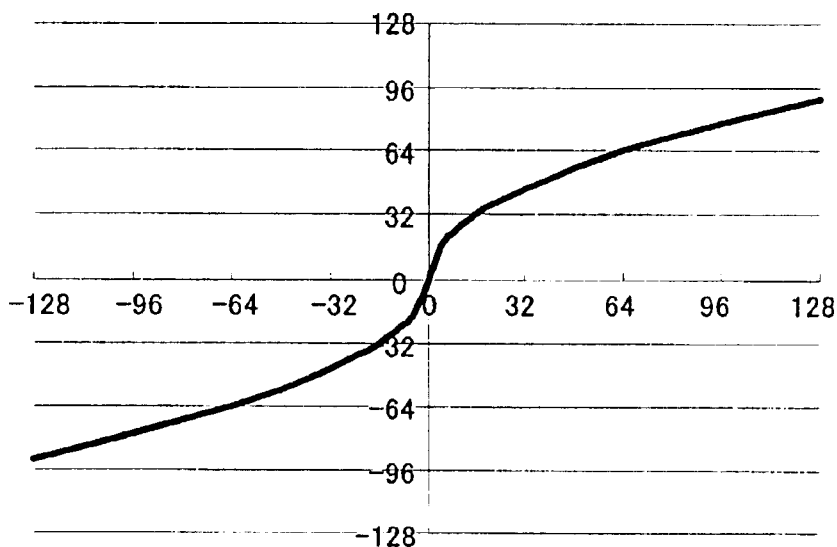
FIGS. 11A and 11B are graphs each showing an example of the input/output characteristic of a look-up table.
Figure 11B:
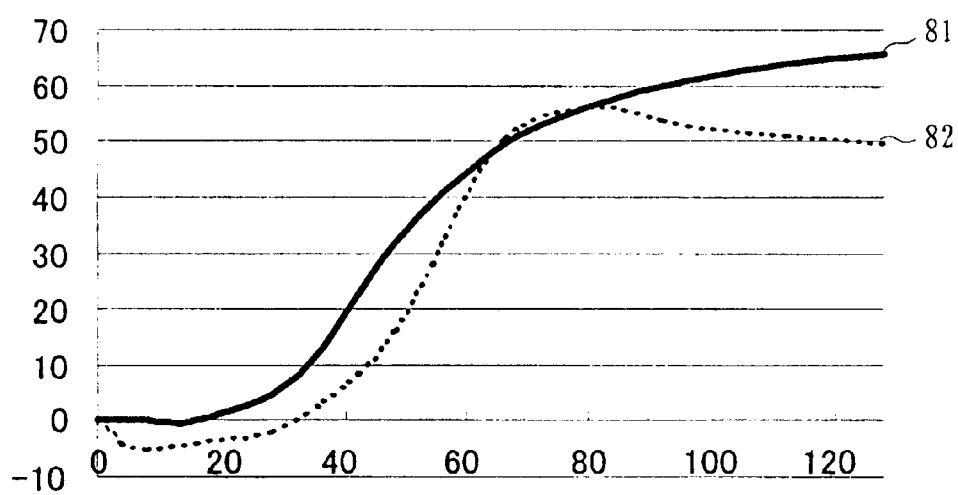

FIGS. 11A and 11B show examples of the input/output characteristic of the look-up table. The abscissa represents the input value, and the ordinate represents the output value.

According to an example of the input/output characteristic in FIG. 11A, the output 14 is enhanced to output a larger value than an input value within a range where the magnitude (absolute value) of the output 14 is relatively small (e.g., −64 to 64).

The output 14 is attenuated to output a smaller value than an input value within a range where the magnitude (absolute value) of the output 14 is relatively large (e.g., −128 to −64 and 64 to 128).

For example, when the absolute value of the output 14 is large, a central pixel originally having a high luminance value readily becomes white, and a central pixel having a low luminance value readily becomes black.

Even if the magnitude of the output 14 is relative large, generation of a white or black central pixel can be avoided by decreasing the adjustment amount of the central pixel $V_0$.

A portion of the input image 13 which is rough owing to noise contains a high spatial frequency component, but the magnitude (power) of the filter output 14 of the M×M spatial filter 2 is small.

When the magnitude of the output 14 is relatively small, the adjustment amount of the central pixel $V_0$ is decreased using an input/output characteristic like a characteristic 81 in FIG. 11B, thereby suppressing enhancement of roughness.

Alternatively, the signs of the coefficients of some subfilters may be inverted using a feature which allows freely changing the input/output characteristic. With this operation, a synthetic filter can be easily realized with a combination of attenuating a high-frequency component and enhancing a low-frequency component.

For example, like a characteristic 82 in FIG. 11B, the polarity (positive/negative) of the output 14 may be inverted. For a range of positive output 14, a negative value may be output.

Accordingly, the filter does not enhance but can attenuate a high-frequency component for a synthetic filter output within the input range.

Figure 12:
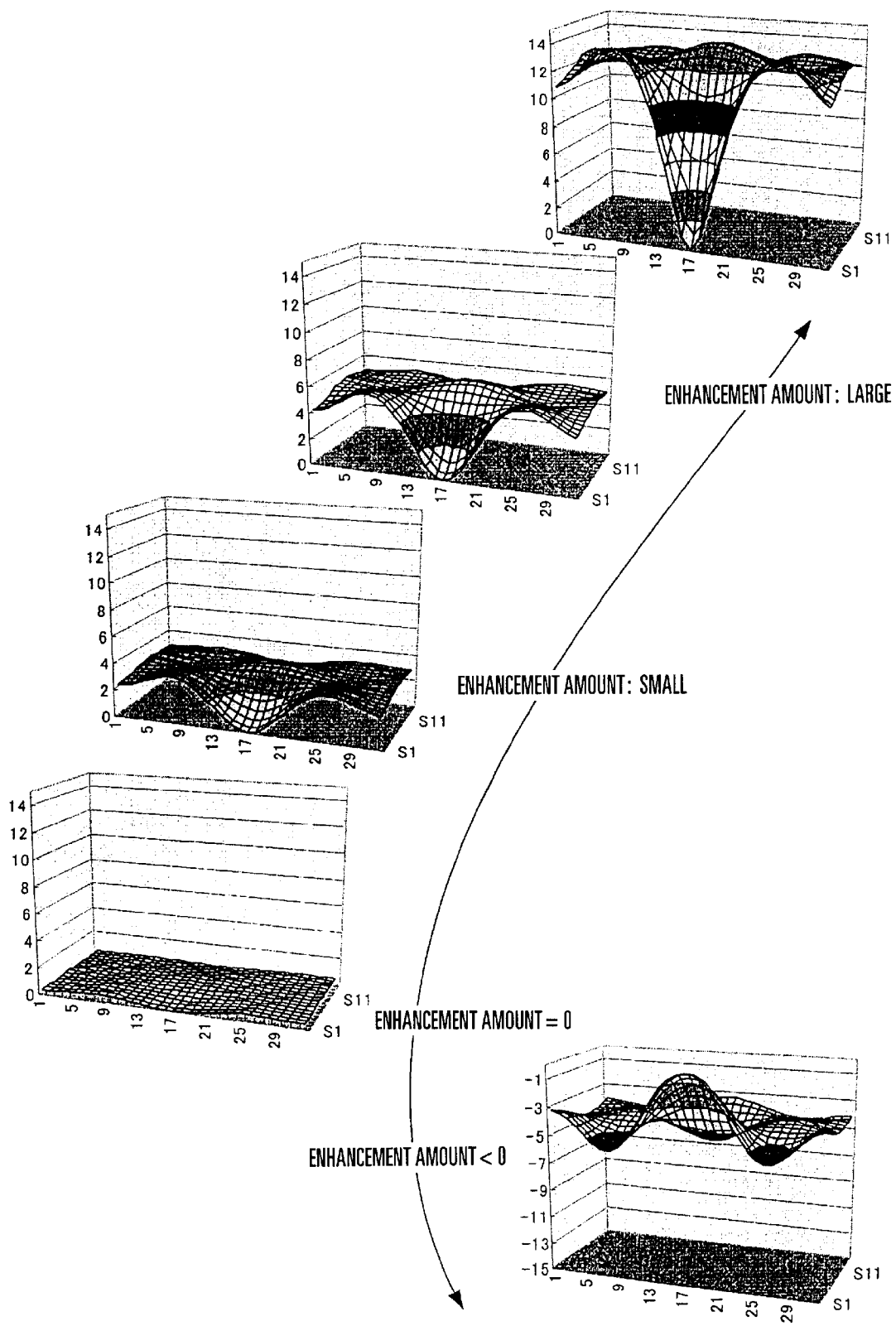
FIG. 12 is an explanatory view showing changes in spatial frequency characteristics by the look-up table.

FIG. 12 shows changes in spatial frequency characteristics by the look-up table.

As is apparent from FIG. 12, the spatial frequency characteristics of the M×M spatial filter 2 can be greatly changed in accordance with the magnitude (power) of the output 14 of the M×M spatial filter 2, i.e., the enhancement amount for the central pixel $V_0$.

In this case, the output 14 may be positive or negative depending on the luminance values of central and peripheral pixels.

If the output 14 is not normalized with respect to changes in the filter coefficient 20, the distribution range (variance) of the filter output 14 changes depending on the coefficient $R_0$ with respect to the central pixel $V_0$.

This poses a problem when the gain is adjusted with filters exhibiting different characteristics.

More specifically, it is difficult to adaptively process a delicate characteristic by simple calculation especially when the variance of the filter output 14 is small and concentrates around 0, and the calculation precision must be increased.

Even in this case, this embodiment enables delicate adjustment by changing the input/output characteristic of the look-up table 8.

As described above, the compensation unit 7 may divide in advance the output 14 by $R_0$ or a power of 2 near $R_0$ to quantize (normalize) the output 14 to a value falling within a predetermined range, and may input the resultant value to the look-up table 8.

This can narrow the input range, and downsize the circuit scale of the look-up table 8.

In particular, division by a power of 2 can be implemented by a simple bit shift circuit.

Alternatively, the compensation unit 7 may quantize the output 14 by the above division processing so as to narrow the input range, read out two output values obtained from the look-up table 8 based on the quantized output 14 and its adjacent value, interpolate (linearly interpolate) the two output values using a portion (lower bits lost by division) rounded down by quantization, and output the interpolated value.

This can further downsize the circuit scale of the look-up table 8 without increasing the compensation error.

This is effective when no quantization is performed to downsize the circuit scale, or when the input/output characteristic steeply changes within a certain range of the look-up table 8 because (the input range of) the look-up table 8 is small.

The fourth embodiment will be described with reference to FIG. 13.

Figure 13:
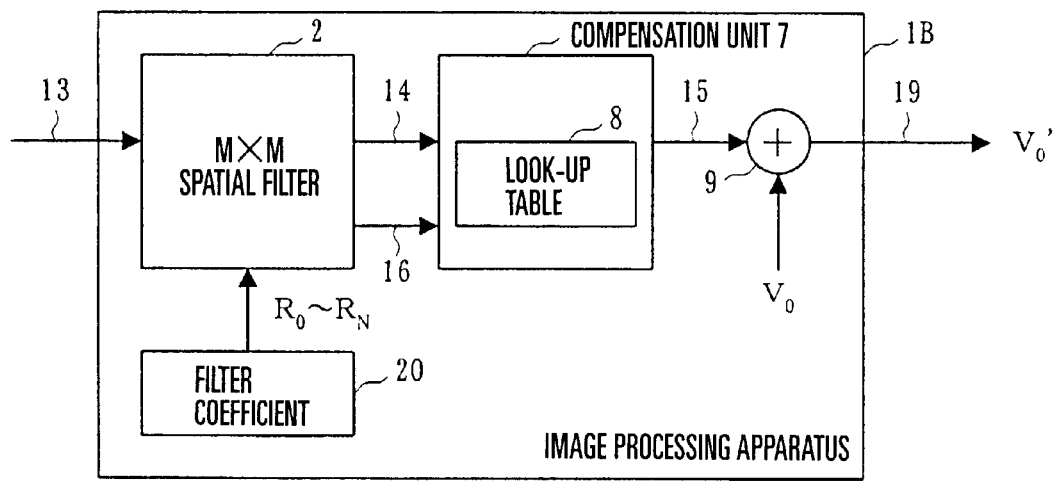
FIG. 13 is a block diagram showing an arrangement of an image processing apparatus according to the fourth embodiment.
Figure 14:
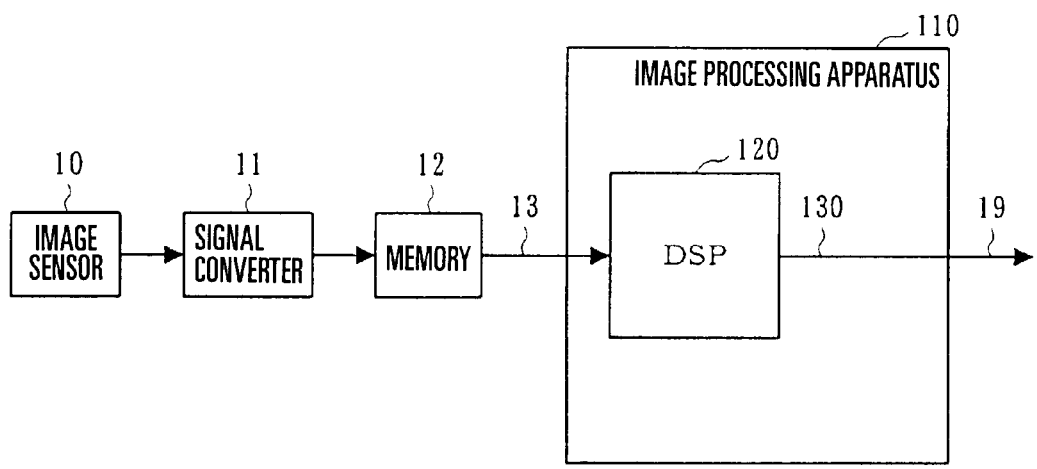
FIG. 14 is a block diagram showing a conventional image processing apparatus.

FIG. 13 shows an arrangement of an image processing apparatus according to the fourth embodiment.

In the fourth embodiment, a compensation unit 7 further compensates for the output value of a look-up table 8 on the basis of predetermined statistics obtained by an M×M spatial filter 2, and outputs the compensated value to an adder 9.

When coefficients $R_0$ to $R_N$ the sum of which is 0 are used as the coefficients $R_0$ to $R_N$ of subfilters 30 to 3N, the enhancement degree (attenuation degree) of the filter is changed by compensating for the output value of the look-up table 8 in accordance with statistics obtained from predetermined pixels to be processed or a target processing range before the output value of the look-up table 8 is added to a central pixel $V_0$.

For example, if high-frequency enhancement filtering processing is done for a bright pixel range of the input image 13, this range hardly contains high spatial frequency components, so an output 14 of the M×M spatial filter 2 (i.e., input of the look-up table 8) is small.

In the use of the look-up table 8 having an input/output characteristic 81 in which an output is small for a small input, or an input/output characteristic 82 in which a range of output is inverted, as shown in FIG. 11B, the output value of the look-up table 8, i.e., enhancement amount decreases or attenuates, and the visibility does not increase in this range.

In this case, the compensation unit 7 multiplies the output value of the look-up table 8 by a compensation coefficient 16 corresponding to the brightness within the pixel range, e.g., an output 40 of the subfilter 30.

This can solve the above problem even for the input/output characteristic shown in FIG. 11B.

Instead of the luminance value of the central pixel, statistics such as the average luminance of the subfilter 31 may be used. In this case, spatial frequency characteristics can often be adjusted with better balance than the luminance value of one pixel.

The compensation coefficient 16 used by the compensation unit 7 may be set using the look-up table 8, as described above, and more flexible enhancement characteristics can be attained.

The enhancement characteristics may be switched in accordance with the values of the color difference signals of a pixel in process or the values of the color difference signals of pixels within a predetermined range around the pixel in process.

For example, roughness can be reduced by preventing excessive enhancement of the high-frequency component of a human face image.

In some cases, the user prefers a smoother skin image to an actual skin. Such an image is made smoother by not enhancing but attenuating a high-frequency component.

The intensities of color difference and luminance signals may be combined, and the enhancement degree may be changed based on the combination.

For example, a bright image portion having many blue components can be determined as a blue sky image, and the enhancement degree can be decreased to reduce roughness.

Spatial frequency characteristics can, therefore, be adjusted using three or four parameters of statistics such as the spatial frequency of a submatrix to be processed, the magnitude of a spatial frequency component obtained by a selected spatial frequency characteristic, and the luminance value or color (color difference signals) in the submatrix.

In the above description, spatial frequency characteristics are adjusted for the luminance value. Alternatively, the same processing may be done for color difference signals.

In this case, chroma can be suppressed using characteristics different from filter characteristics for the luminance value.

An image processing apparatus for performing image compression processing can also execute another filtering processing by a two-dimensional orthogonal transformation unit.

For example, an image sensing apparatus such as a digital camera disclosed in Japanese Patent Application No. 11-131976 (by the same applicant as the present invention) performs two-dimensional orthogonal transformation for image compression to an 8×8 region.

This means that frequency characteristics can be more finely adjusted for M<8. Even if the gain at the high-frequency range of the spatial frequency is set high in the M×M spatial filter 2, only a frequency component near the maximum frequency can be attenuated.

In the case wherein filtering processing is done for only a high spatial frequency range after (or during) two-dimensional orthogonal transformation, even if an image is reconstructed through quantization processing after two-dimensional orthogonal transformation, so-called block noise can be made less conspicuous, and a noise component which is contained in an original image and enhanced more than necessary can also be made less conspicuous.

As has been described above, according to the present invention, subfilters are arranged for a plurality of peripheral pixel groups each made up of one or more pixels in a submatrix. The subfilters multiply in parallel with each other the sums of the luminance values of pixels included in corresponding pixel groups by predetermined coefficients corresponding to desired filter characteristics for adjusting spatial frequency characteristics. After outputs from the subfilters are totaled, the sum is added to the pixel value of an original central pixel, and the resultant sum is output as a new luminance value. Thus, relative simple calculation in each submatrix, and subsequent processing such as totalization and addition with a relatively small calculation amount even for a large submatrix can adjust spatial frequency characteristics with a large degree of freedom without performing complicated calculation processing.

Each subfilter executes only relatively simple calculation processing such as addition and multiplication. At the same time, the subfilters parallel-execute calculation operations. Thus, spatial frequency characteristics can be adjusted in real time at a higher speed.

What is claimed is:

1. An image processing apparatus for calculating a new luminance value of a central pixel to adjust spatial frequency characteristic of an input image, comprising:

a plurality of subfilters which are arranged in parallel with each other for a plurality of pixel groups each made up of at least one pixel in a submatrix, multiply sums of luminance values of pixels included in corresponding pixel groups by predetermined coefficients corresponding to desired spatial frequency adjustment filter characteristics, and output products for each submatrix consisting of M×M (wherein M is an odd number of not less than 3) pixels centered on pixels constituting an input image for a two-dimensional input image comprising many pixels that are arrayed in a matrix and that represent luminance values at positions;

totalization means for totaling outputs from said subfilters and for outputting a sum as an adjustment amount of the spatial frequency characteristics; and addition means for adding the adjustment amount obtained by said totalization means to an original luminance value of the central pixel and outputting a sum as a new luminance value of the central pixel for each matrix, wherein said subfilters are operative to sequentially receive pixel blocks of the input image, said pixel block each consisting of M pixels aligned in a common column in a matrix of exactly M parallel columns, said subfilters being further operative to sequentially multiply sums of luminance values included in corresponding pixel groups by predetermined coefficient corresponding to desired spatial frequency adjustment filter characteristic using luminance values of pixels included in a submatrix made up of said M successively received pixel blocks, and wherein said subfilters are operative to output resultant multiplication products.

2. An apparatus according to claim 1, wherein the pixel groups include:

a central pixel group comprising a central pixel; and a plurality of peripheral pixel groups each comprising at least four pixels positioned point-symmetrically about the central pixel.

3. An apparatus according to claim 1, wherein each peripheral pixel group comprises pixels other than the central pixel that fall within a range of m×m (wherein m is an odd number of 3 to M) pixels centered on the central pixel, and has not less than four pixels consisting of upper, lower, right, and left pixels adjacent to the central pixel.

4. An apparatus according to claim 1, wherein to coefficients corresponding to the pixel groups include a sum of powers of 2 or a negative number of the sum.

5. An apparatus according to claim 1, wherein the coefficients corresponding to the pixel groups include coefficients corresponding to magnitudes of two color difference signals obtained from the central pixel or the peripheral pixels.

6. An apparatus according to claim 1 further comprising compensation means arranged between said totalization means and said addition means to compensate for and output the adjustment amount from said totalization means, and wherein said addition means is operative to add a compensated adjustment amount output from said compensation means to the original luminance value of the central pixel, in order to output a sum representing a new luminance value of the central pixel.

7. An apparatus according to claim 6, wherein said compensation means comprises a look-up table having a predetermined input/output characteristic, and wherein said compensation means is operative to reference the look-up table based on the adjustment amount from said totalization means to output an output value obtained from the look-up table as the compensated adjustment value.

8. An apparatus according to claim 7, wherein said compensation means refers to the look-up table based on a value obtained by quantizing the adjustment value from said totalization means.

9. An image processing apparatus for calculating a new luminance value of a central pixel to adjust spatial frequency characteristic of an input image, comprising:

a plurality of subfilters which are arranged in parallel with each other for a plurality of pixels groups each made up of at least one pixel in a submatrix, multiply sums of luminance values of pixels included in corresponding pixel groups predetermined coefficients corresponding to desired spatial frequency adjustment filter characteristic, and output products for each submatrix consisting of M×M (wherein M is an odd number of not less than 3) pixels centered on pixels constituting an input image for a two-dimensional input image comprising many pixels that are arrayed in a matrix and that represent luminance values at positions;

totalization means for totaling outputs from said subfilters and for outputting a sum as an adjust amount of to spatial frequency characteristics;

addition means for adding the adjustment amount obtained by said totalization means to an original luminance value the central pixel and outputting a sum as a new luminance value of the central pixel for each matrix; and hardware-based compensation means to maximize operational speed arranged between said totalization means and said addition means to compensate for spatial frequency characteristic to obtain a compensated adjustment amount for renormalizing luminance range and to output the compensated adjustment amount from said totalization means, wherein said addition means is operative to add a compensated adjustment amount output from said compensation means to the original luminance value of the central pixel, in order to output a sum as a new luminance value of the central pixel.

10. An apparatus according to claim 9, wherein said compensation means comprises a look-up table having a predetermined input/output characteristic, and wherein said compensation means is operative to reference look-up table based on the adjustment amount from said totalization means to output an output value obtained from tho look-up table as the compensated adjustment value.

11. An apparatus according to claim 10, wherein said compensation means refers to the look-up table based on a value obtained by quantizing the adjustment value from said totalization means.

12. An image processing apparatus for calculating a new luminance value of a central pixel to adjust spatial frequency characteristics of an input image, comprising:

a plurality of subfilters which are arranged in parallel with each other for a plurality of pixel groups, each subfilter comprising at least one pixel in a submatrix, and are operative to multiply sums of luminance values of pixels included in corresponding pixel groups by predetermined coefficient corresponding to desired spatial frequency adjustment filter characteristics, and to output products for each submatrix made up of M×M (wherein M is an odd number of not less than 3) pixels centered on pixel constituting an input image for a two-dimensional input image made up of many pixels that are arrayed in a matrix and represent luminance value at position;

totalization means for totaling outputs from said subfilter and outputting a sum as an adjustment amount of the spatial frequency characteristics;

addition means for adding the adjustment amount obtained by said totalization means to an original luminance value of the central pixel; and compensation means arranged between said totalization means and said addition means to compensate for and output the adjustment amount from said totalization means, said addition means being operative to add a compensated adjustment amount output from said compensation means to the original luminance value of the central pixel, and to output a sum as a new luminance value of the central pixel, said compensation means further comprising a look-up table having a predetermined input/output characteristic and operative to refer to the look-up table based on the adjustment from said totalization means in order to obtain an value from the look-up table as the compensated adjustment value and to re-compensate for the value obtained from the look-up table based on predetermined statistics calculated from luminance values of pixels constituting a predetermined pixel group in the submatrix, in order to output the re-compensated output value as the compensated adjustment amount;

said addition means being further operative to add said re-compensated adjustment amount output from said compensation means to the original luminance value of the central pixels, in order to output a sum as a new luminance value of the central pixel.

13. An image processing apparatus for calculating a new luminance value of a central pixel to adjust spatial frequency characteristics of an input image, comprising:

a plurality of subfilters which are arranged in parallel with each other for a plurality of pixel groups, each subfilter comprising at least one pixel in a submatrix, and are operative to multiply sums of luminance values of pixels included in corresponding pixel groups by predetermined coefficients corresponding to desired spatial frequency adjustment filter characteristics, and to output products for each submatrix made up of M×M (wherein M is an odd number of not less than 3) pixels centered on pixels constituting an input image of a two-dimensional input image made up of many pixels that are arrayed in a matrix and represent luminance values at position;

totalization means for totaling outputs from said subfilters and outputting a sum as an adjustment amount of the spatial frequency characteristic;

addition means for adding the adjustment amount obtained by said totalization means to an original luminance value of the central pixel; and compensation means arranged between said totalization means and said addition means to compensate for and output the adjustment amount from said totalization means, said addition means being operative to add a compensated adjustment amount output from said compensation means to the original luminance value of the central pixel, and to output a sum as a new luminance value of the central pixel, said compensation means further comprising a look-up table having a predetermined input/output characteristic and operative to refer to the look-up table based on the adjustment amount from said totalization means in order to obtain an value from the look-up table as the compensated adjustment value, said compensation means being further operative to refers to the look-up table based on a value obtained by quantizing the adjustment value from said totalization means, and to interpolates the output value obtained from the look-up table based on a rounded-down portion of the adjustment amount that is not used for reference of the look-up table, in order to output the interpolated output value as the compensated adjustment amount;

said addition means being further operative to add said compensated adjustment amount output from said compensation means to the original luminance value of the central pixel, in order to output a sum as a new luminance value of the central pixel.

* * * * *